Jan. 14, 1947.    J. MARZIANI    2,414,157
HEAT AND PRESSURE APPLYING DEVICE
Filed Dec. 27, 1945    2 Sheets-Sheet 1
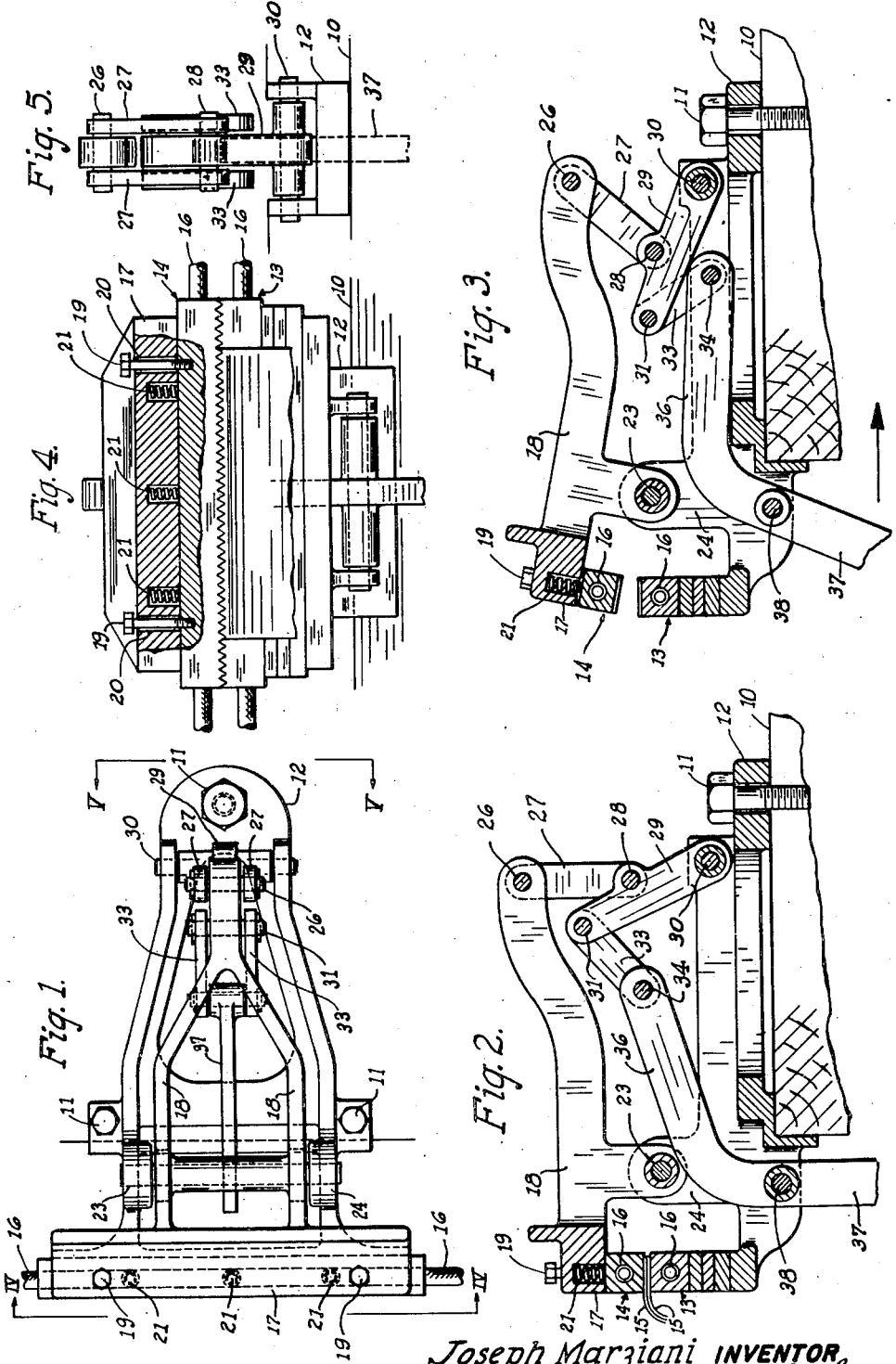
Joseph Marziani INVENTOR
BY Louis Necho
ATTORNEY Jan. 14, 1947.  J. MARZIANI  2,414,157
HEAT AND PRESSURE APPLYING DEVICE
Filed Dec. 27, 1945   2 Sheets-Sheet 2
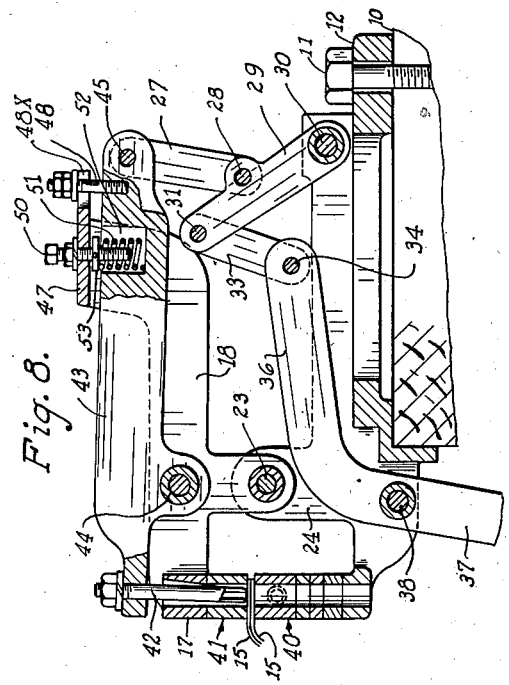
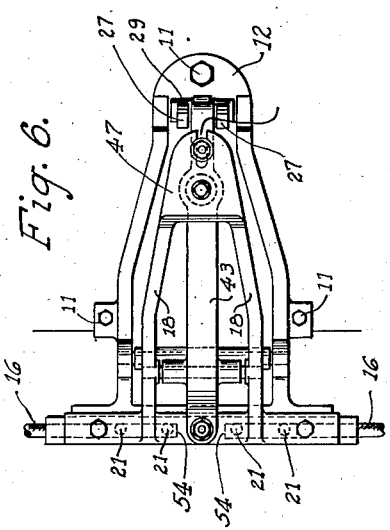
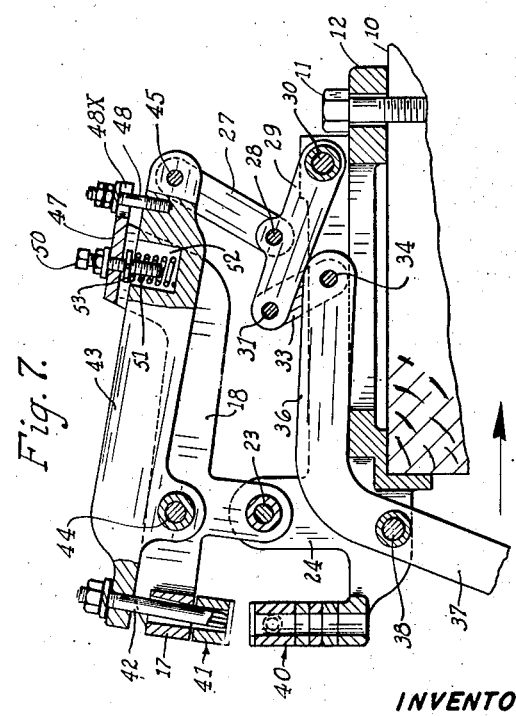
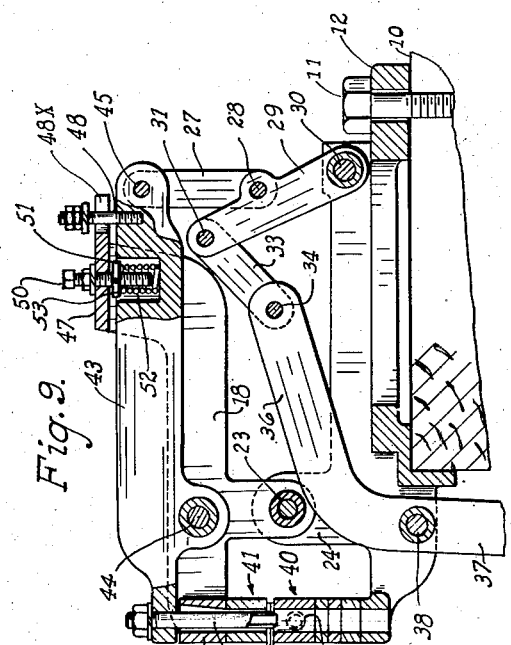
INVENTOR Joseph Marziani.
BY
ATTORNEY Patented Jan. 14, 1947

2,414,157

UNITED STATES PATENT OFFICE 2,414,157

HEAT AND PRESSURE APPLYING DEVICE

Joseph Marziani, Philadelphia, Pa.

Application December 27, 1945, Serial No. 637,430

7 Claims. (Cl. 154—42)

My invention relates to a heat and pressure applying device of the type used for permanently uniting two or more sheets of material formed of, or coated with, a material which fuses under heat. A device like this can be used, for example, for sealing the mouths of bags to produce a fluid-tight joint or for laminating a plurality of sheets, etc.

One object of the invention is to produce an improved device of the type set forth.

A further object is to produce an improved device of this kind which will be portable, durable, inexpensive to make and easy to operate and control.

A still further object is to produce an improved device of the type described in which the sheets to be united are subjected to the desired heat and in which the pressure may be applied in successive stages or degrees.

A still further object is to produce an improved apparatus which is adapted, simultaneously with the sealing or laminating operation, to punch a hole or slot through the united or laminated sheets.

These and other objects are attained by my invention as set forth in the following specification and illustrated in the accompanying drawings in which:

Fig. 1 is a top plan view of a heat and pressure applying device illustrating one embodiment of my invention, certain parts being omitted.

Fig. 2 is a fragmentary view, partly in vertical section and partly in side elevation, of the device shown in Fig. 1, with the device shown in the closed, or pressure applying position.

Fig. 3 is a view similar to Fig. 2, showing the device in the open, or inoperative position.

Fig. 4 is a fragmentary view, partly in vertical section and partly in front elevation, looking in the direction of line 4—4 on Fig. 1.

Fig. 5 is a rear elevational view looking in the direction of line 5—5 of Fig. 1.

Fig. 6 is a top plan view illustrating an embodiment of the invention provided with means for punching a hole in the sheets after, or as, they are thermally united.

Fig. 7 is a view, partly in vertical section and partly in side elevation, of the embodiment of Fig. 6, the same being shown in the open or inoperative position.

Fig. 8 is a view, similar to Fig. 7, showing the device closed or in sealing position, but prior to the punching operation.

Fig. 9 is a view, similar to Fig. 8, showing the device in the position it assumes during the performance of the punching operation.

In both of the embodiments shown, the heat and pressure applying device is of a portable nature, so as to be detachably mounted on any convenient work bench or table 10 by means of any suitable means, such as bolts 11 passing through openings in a base casting 12 and engaging the table 10 as shown in Figs. 2 and 7, for example.

The heat and pressure applying device shown in Figs. 1 to 5 includes an elongated fixed lower jaw 13 and an elongated movable upper jaw 14, between which the sheets 15 to be united may be subjected to the desired heat and pressure. The jaws 13 and 14 are provided with electric heating elements 16 supplied with energy from a source, not shown, and controlled by a thermostat or the like, also not shown. As shown in Fig. 4, the coacting faces of the upper and lower jaws may be serrated if desired.

The lower jaw 13 is part of, or fixedly carried by the base casting 12 and is sufficiently strong to resist the pressure to which it is subjected when the device is in use. The upper jaw 14 is secured to an elongated head 17 carried by, or formed integral with, the front ends of a pair of levers 18 by means of bolts 19 which are threaded into the jaw but which slide freely in openings 20 in the head 17. The upper jaw is biased downwardly or away from the head 17 by compression springs 21. As will be seen from Fig. 3, when the jaws are open, the springs are expanded and the upper jaw 14 is spaced from the head 17, whereas, when the jaws are closed and are applying pressure on the sheets 15, as shown in Figs. 2 and 4, the springs are compressed, the upper jaw abuts the head 17, and the heads of the bolts 19 are disposed above the top surface of the head. By this construction, the sheets 15 are subjected to effective but yielding pressure. The levers 18 are articulated relative to the lower jaw by means of a double-acting toggle mechanism which may be actuated by a source of power, not shown, or by a hand or foot pedal, as illustrated in Figs. 2 and 3.

As shown, the levers 18 are pivoted at 23 to a support 24 carried by, or forming part of, the base casting 12. The pivot 23 is preferably close to the front ends of the levers and to the upper jaw so as to minimize the movement of the upper jaw and to provide mechanical advantage. The rear ends of the levers 18 converge and are pivoted at 26 to a pair of links 27 which are pivoted at 28 to the central portion of a lever 29. The lever 29 is fulcrumed at 30 to the base casting 21, and is pivoted at 31 to a pair of links 33, the other ends of which are pivoted at 34 to one end 36 of a foot lever 37. The foot lever is fulcrumed at 38 to the base casting 12 and terminates at its other end in a foot pedal, not shown. The foot pedal 37 extends at substantially a right angle to the end portion 36 and is weighted so that it normally occupies the position shown in Fig. 3, in which the device is open, or the jaws are separated for reception of the sheets 15.

Operation

With the device in the position shown in Fig. 3, the two sides of the mouth of a bag, or the sheets 15 are placed on the lower jaw 13 and pressure is applied to the foot pedal to move the lever 36 in the direction of the arrow in Fig. 3, or from the position shown in Fig. 3 to that shown in Fig. 2.

It will be noted that when the foot lever is free and the jaws are separated, the lever 29 approaches a horizontal position and is so arranged that its abutment against the base casting or against the end 36 of the foot lever 37 (see Fig. 3) limits the upward movement of the upper jaw. Also, in this position, the pivots 28 and 34 are at their closest proximity and are disposed in substantially vertical alignment, while the pivot 31 is swung over center and forwardly of the pivot 34. As the foot pedal is moved rearwardly, the end portion 36 of the foot lever rotates about the fulcrum 38, thus causing the links 33, the lever 29 and the links 27 to assume the positions shown in Fig. 2. In this position, the links 27 are pushed into a substantially vertical position, thereby raising the rear ends of the levers 18 and lowering the front ends thereof to bring the upper jaw 14 to bear against the lower jaw 13. As the pressure on the foot pedal is increased, the springs 21 are compressed and the sheets 15 are subjected to yielding pressure which is a function of the pressure applied to the foot pedal. It will be understood that, when the device is in use, the heaters 16 are energized so that the sheets 15 are subjected to heat sufficient to soften or fuse the affected portions of the sheets or the material with which they are coated to cause said sheets to unite firmly and permanently.

The embodiment of Figs. 6 to 9 includes the same work bench 10, base casting 12, levers 18, links 27, lever 29, links 33, and foot pedal 36, 37. This embodiment, however, is provided with a hollow lower fixed jaw 40 and a hollow movable upper jaw 41 for accommodating a punch 42. The punch 42 is carried by a central articulating lever 43 pivoted near the front end thereof to the levers 18, as at 44, and pivoted at its rear end to the links 27, as at 45. In order to accommodate the punch, the head 17 which carries the hollow upper jaw 41 is provided with an aperture which registers with the aperture in the upper jaw, as clearly shown in Figs. 8 and 9. In this construction, the rear ends of the levers 18 are not pivoted to the links 27 as in the embodiment previously described. Instead, the rear ends of the levers 18 merge to form a yoke 47 which is disposed above, and straddles, the rear pivoted end of the lever 43. A bolt or pin 48 is threaded into the rear end of the lever 43 and is freely movable longitudinally in a slot 48X formed in the yoke 47. The head of the pin 48 is bigger than the slot 48X, so as to serve as a stop for limiting the upward movement of the yoke, as shown in Fig. 8. The lever 43 is operatively connected to the levers 18 by means of a bolt 50 threaded through the yoke 47 and carrying a compression spring 51 disposed in a pocket 52 formed in the rear end of the lever 43 at a point below the yoke 47. The bolt 50 is provided with a fixed collar 53 which bears against the top of the spring 51 and by means of which the tension of the spring may be varied upon rotation of the bolt 50. It will be noted that the free end of the lever 43 which carries the punch 42 is, except for the action of the spring 51, entirely free to move relative to the upper jaw 41. It will be evident from the structure described that the spring 51 normally tends to push down on the rear end of the lever 43, thus rotating the lever in clockwise direction on the pivot 44 (Fig. 7) and raising the punch so that the lower end thereof is above the plane of the effective surface of the upper jaw. It will also be seen that the initial raising of the rear end of the lever 43 will cause the levers 18 to rotate in counterclockwise direction on the pivot 23 so as to lower the upper jaw into engagement with the lower jaw.

With the jaws open, as in Fig. 7, the material to be joined and punched is placed on the lower jaw and the foot pedal is moved in the direction of the arrow in Fig. 7. This moves the linkage previously described to the position shown in Fig. 8, in which the rear end of the lever 43 is raised. Due to the resistance of the spring 51, the levers 18 carrying the head 17 and the jaw 41 rotate about the pivot 23 and bring the upper jaw into engagement with the lower jaw. The sheets 15 are now subjected to heat but to very little pressure. Further pressure on the foot pedal compresses the springs 21 so as to apply increased pressure on the sheets 15 in the manner above described. When it is desired to actuate the punch 42, still further pressure is exerted on the foot pedal so as to cause the lever 43 to rotate in counterclockwise direction on the pivot 44. This causes the punch to move downwardly, through the sheets 15 and into the aperture in the lower jaw, as shown in Fig. 9. The aperture in the lower jaw extends completely therethrough so that the cutouts from the sheet can drop onto the floor or into a receptacle placed below the lower jaw 40. Since the spring 51 tends to resist upward movement of the rear end of the lever 43, it follows that the pressure exerted in the initial stages of operation serve to effect union of the sheets and that, by the time sufficient pressure is exerted to overcome the force of the spring 51 and actuate the punch, the sheets have been firmly united so that the punching of a hole through the united portions of the sheet does not destroy the tight joint formed therebetween. By adjusting the strength of the spring, the action of the punch can be advanced or delayed with reference to the operation of the foot pedal and the linkage connecting the same to the rear end of the lever 43.

By comparison of Figs. 8 and 9, it will be seen that, after the application of initial pressure sufficient to bring the jaws together and at least partly to compress the springs 51, the links 27 assume the position shown in Fig. 8, and that upon application of pressure sufficient to operate the punch, the links 27 move to the position shown in Fig. 9. This graphically illustrates the distinct stages of operation. Due to the presence of the punch, the heating elements used in this modification enter the jaws from the opposite ends thereof and terminate short of the punch, as indicated at 54 in Fig. 6.

Since, except as described, the structure of this embodiment is the same as that previously described, it was deemed unnecessary to duplicate the description, and the same reference numerals have been used to designate such parts as are common to both embodiments.

What I claim is:

1. In a device of the character stated, a fixed support, a lower jaw fixedly carried by said support, a first lever disposed above, and pivoted near one end thereof to said support, an upper jaw carried by said end of said lever and adapted to coact with said lower jaw to exert pressure on material placed between said jaws, an operating lever pivoted to said support at a point near, and below, the pivotal connection of said first lever with said support, said operating lever including an arm extending from its pivotal connection towards the other end of said first lever, a first link pivoted at one end thereof to the end of said arm, a second lever fulcrumed at one end thereof to said support at a point below, and near, the other end of said first lever, and pivoted at its other end to the other end of said first link, a second link pivoted at one end thereof to said second lever at a point intermediate the ends of said second lever, and means connecting the other end of said second link to the other end of said first lever for transmitting the movement of said second lever to said first lever, said operating lever, said arm, said links and said second lever being so proportioned and connected that said operating lever is normally pivoted during a direction away from said support, in which pivoting of said operating lever, said arm, said links, and said second lever approach horizontal positions, and said first lever is pivoted in a direction to move said upper jaw away from said lower jaw, and so that when said operating lever is moved in the opposite direction, said links and said second lever assume substantially vertical positions in which said first lever is pivoted in a direction to press said upper jaw against said lower jaw.

2. The structure recited in claim 1 together with means for heating at least one of said jaws.

3. The structure recited in claim 1 together with means for yieldably mounting at least one of said jaws.

4. The structure recited in claim 1 together with means operable upon movement of said upper jaw into engagement with said lower jaw for cutting through said material.

5. The structure recited in claim 1 in which said jaws have registering apertures formed therein and a cutting device movable in said apertures and operable upon movement of said upper jaw into engagement with said lower jaw to cut through said material.

6. In a device of the character stated, a fixed support, a lower jaw fixedly carried by said support, a first lever disposed above, and pivoted near one end thereof to said support, an upper jaw carried by said end of said lever and adapted to coact with said lower jaw to exert pressure on material placed between said jaws, an operating lever pivoted to said support at a point near, and below, the pivotal connection of said first lever with said support, said operating lever including an arm extending from its pivotal connection towards the other end of said first lever, a first link pivoted at one end thereof to the end of said arm, a second lever fulcrumed at one end thereof to said support at a point below, and near, the other end of said first lever, and pivoted at its other end to the other end of said first link, a second link pivoted at one end thereof to said second lever at a point intermediate the ends of said second lever, a third lever pivoted near one end thereof to said first lever at a point near said upper jaw, a cutting device carried by said third lever, there being registering openings in said jaws through which said cutting device is operable, means movably connecting the other end of said third lever to the corresponding end of said first lever, biasing means urging said third lever away from said first lever, and means pivotally connecting the other end of said second link to said other end of said third lever for transmitting the movement of said second lever to said third lever, and through said biasing means to said first lever, said operating lever, said arm, said links and said second lever being so proportioned and connected that said operating lever is normally pivoted in a direction away from said support, during which pivoting of said operating lever said links and said second lever approach horizontal positions, and said first and third levers are pivoted in a direction to move said upper jaw and said cutting device out of engagement with said lower jaw, and so that when said operating lever is moved in the opposite direction, said links and said second lever assume substantially vertical positions in which said first lever is pivoted in a direction to press said upper jaw against said lower jaw and said third lever is pivoted to operate said cutting device.

7. The structure recited in claim 6 in which the first and third levers are operated successively whereby said material is pressed prior to the operation of the cutting device.

JOSEPH MARZIANI.